United States Patent [19]

Copeland et al.

[11] 4,101,474

[45] Jul. 18, 1978

[54] AQUEOUS BASED EPOXY SLURRY FOR FORMING A CONSOLIDATED GRAVEL PACK

[75] Inventors: Claude T. Copeland, Tulsa; Vernon G. Constien, Owasso, both of Okla.

[73] Assignee: The Dow Chemical Company, Midland, Mich.

[21] Appl. No.: 807,094

[22] Filed: Jun. 16, 1977

Related U.S. Application Data

[62] Division of Ser. No. 737,813, Nov. 1, 1976, Pat. No. 4,074,760.

[51] Int. Cl.² ............................................. E21B 43/04
[52] U.S. Cl. ............................... 260/13; 260/29.2 EP
[58] Field of Search ........................... 260/29.2 EP, 13

[56] References Cited

U.S. PATENT DOCUMENTS

| | | | |
|---|---|---|---|
| 2,817,602 | 12/1957 | Pardo | 260/29.2 EP |
| 2,823,753 | 2/1958 | Henderson et al. | 260/14 |
| 3,285,339 | 11/1966 | Walther et al. | 166/295 |
| 3,854,533 | 12/1974 | Gurley et al. | 166/276 |
| 3,867,986 | 2/1975 | Copeland | 166/295 |

OTHER PUBLICATIONS

Kirk–Othmer "Encyclopedia of Chem. Tech. Second Ed." vol. 16, pp. 863–864; vol. 19, pp. 562–564.

*Primary Examiner*—Murray Tillman
*Assistant Examiner*—Arthur H. Koeckert

[57] ABSTRACT

An aqueous based slurry is disclosed containing an aqueous carrier fluid, an epoxy resin, a curing agent for the resin, a solvent for said resin and curing agent, a finely divided particulate material, a particular quaternary ammonium halide, and a coupling agent to promote bonding of the resin to the particulate. Optionally, the slurry may contain a thickening or gelling agent for the water to enhance its solids carrying capacity and an agent to break the gel after its purpose has been served. The slurry, suitable for use in placing a permeable, consolidated gravel pack adjacent an incompetent subterranean formation, is characterized in that it does not require an oil-based carrier and also in that it can easily be prepared in the field by adding the particulate directly to the aqueous carrier without precoating the particulate with the resin.

42 Claims, No Drawings

AQUEOUS BASED EPOXY SLURRY FOR FORMING A CONSOLIDATED GRAVEL PACK

CROSS-REFERENCE TO RELATED APPLICATION

This is a division of application Ser. No. 737,813 filed Nov. 1, 1976, now U.S. Pat. No. 4,074,760, issued Feb. 2/2/78.

I. BACKGROUND OF THE INVENTION

A. Field of the Invention

The invention relates to a method and a slurry suitable for use in treating a well penetrating an unconsolidated formation by emplacing a resin consolidated pack of particulate material adjacent the formation, and to a method of preparing the slurry.

B. Description of the Art

Production of detritus from unconsolidated, i.e. incompetent, subterranean formations producing valuable fluids, such as production of sand from an incompetent sandstone formation, is an ever present problem, particularly in the petroleum industry. A good discussion of the problem, and of the various techniques used to minimize concurrent production of such detritus can be found in an eight part series by George O. Suman, Jr., appearing in World Oil from November, 1974, through June, 1975. The series was published in 1975 as a reprint by Gulf Publishing Co. under the title "World Oil's Sand Control Handbook," the teachings of which are expressly incorporated herein. Three commonly used methods are (1) gravel packing, (2) plastic in situ consolidation, and (3) consolidated packing with a particulate material, often called consolidated gravel packing especially where the particulate material is sand. The latter technique is discussed in Part 7 of said Handbook, and it is this latter technique to which the present invention pertains.

In the early consolidated gravel packing art, typified by Henderson et al, U.S. Pat. No. 2,823,753, it was taught to coat a particulate with a resin, suspend the coated particulate in a suitable carrier, and inject the suspension into the borehole. Both oil based and aqueous based carriers were taught in the early literature (see, e.g. column 7, line 50 through column 8, line 5 of said U.S. Pat. No. 2,823,753), although as a practical matter, systems using aqueous carriers were never developed to the point of widespread commercial acceptance.

Precoated particulates had several drawbacks, however. Some precoated particulates were not sufficiently stable to be stored and transported without agglomeration. Others which could be handled without an objectionable degree of agglomeration suffered from an inability to form strong packs in low temperature wells, while stimultaneously maintaining adequate permeability. Consequently, efforts were generally concentrated on developing high particulate concentration oil based slurries which could be prepared without precoating the particulate prior to admixture with the carrier, and in maximizing the strength and permeability parameters of such systems.

Oil based systems, however, also suffer from numerous inherent disadvantages. In offshore operations, unused oil carried slurry must be transported back to shore, and even on land, disposal in an ecologically acceptable manner presents a problem. Purchasing the oil used as a carrier and carrying it in inventory adds cost to the treatment, particularly in periods of tight supply. Safety risks are somewhat greater with large quantities of combustible material at the well site. Some sources of brightstock oil have such high levels of cationic contaminants that poorly consolidated packs result even after treatments to neutralize at least partially the effect of such contaminants, such as by implementation of the teachings at column 4, line 60 et seq. of Copeland, U.S. Pat. No. 3,867,986. A further disadvantage of the oil carried systems is that the oil, which typically has a viscosity on the order of about 1000 centipoise at 80° F, becomes considerably more viscous at lower surface temperatures, e.g. below 50° F, making it difficult to handle. Also, well operators are reluctant to use oil carried systems in gas wells because of concern of possible formation damage by injection of heavy oil. Considerable friction loss is encountered in oil carried systems, making it difficult to fracture many formations without generating excessive pressures at the well head, so that the fracturing technique taught by Gurley et al. in U.S. Pat. No. 3,854,533 could not always be implemented safely. Finally, the sensitivity of oil-carried systems to water based fluids required careful handling prior to injection, and the use of oil as a displacing fluid or use of a wiper plug to separate the slurry from a water-based displacement fluid. These problems associated with oil carried systems can be avoided or at least ameliorated by practicing the present invention.

II. Summary of the Invention

The present invention comprises a pumpable slurry, a method of making the slurry, and a method of emplacing a permeably consolidated particulate mass in communication with a subterranean formation. The slurry comprises a particulate material, an epoxy resin-solvent mixture, a curing agent, a coupling agent, an aqueous carrier fluid preferably substantially free of free polyvalent metal cations in solution, and at least one surfactant selected from the group consisting of quaternary ammonium salts corresponding to the formula

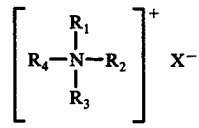

wherein: $R_1$ and $R_3$ are each independently lower alkyl, hydroxy substituted lower alkyl, or polyoxyethylene alkyl of the formula — $(CH_2CH_2O)_nH$ wherein $n$ is 2 or 3; $R_2$ is an 8- through 18-carbon hydrocarbon chain; $R_4$ is an aliphatic hydrocarbon chain or an alkyl aryl group, containing 7 through 18 carbon atoms; and X is fluorine, chlorine, bromine, or iodine. The aforementioned components of the slurry are present in amounts such that a pumpable slurry is obtained from which after a suitable curing time, a permeable consolidated mass can be formed. The slurry is preferably made by separately admixing (a) the carrier fluid, the surfactant, and the particulate, and (b) the epoxy-solvent mixture, the curing agent, and the coupling agent, and thereafter admixing admixtures (a) and (b).

A permeably consolidated particulate mass is emplaced adjacent a subterranean formation by introducing the slurry into a well bore into communication with the formation and curing the slurry in place to form the mass.

III. Detailed Description of the Invention

The epoxy resin-solvent mixture, the curing agent, the particulate material, and the coupling agent are not unlike those employed in oil carried systems such as disclosed by Copeland in U.S. Pat. Nos. 3,857,444; 3,867,986; and 3,878,893; the teachings of all of which are expressly incorporated herein. The crux of the present invention, however, is the discovery that by use of a particular type of surfactant, and in some cases a particular mixing order, such components can be used with an aqueous carrier fluid. Moreover, the particulate is not pre-coated with the epoxy resin before addition to the carrier, as was required in Henderson et al., U.S. Pat. No. 2,823,753.

A. Epoxy Resin

The epoxy resin employed in the invention comprises those organic materials possessing more than one epoxy group. Examples of the polyepoxides include 1,4-bis(2,3-epoxypropoxy) benzene, 1,3-bis(2,3-epoxypropoxy) benzene, 1,4'-bis(2,3-epoxypropoxy) diphenyl ether, 4,4'-bis(2-methoxy-3,4-epoxybutoxy) diphenyl dimethylmethane, and 1,4-bis(2-methoxy-4,5-epoxypentoxy) benzene.

Other examples of resins suitable for use herein are glycidyl-type epoxy resins such as those described by Lee et al. in Handbook of Epoxy Resins, McGraw-Hill, 1967, Chapter 2.

Specific examples include the epoxy polyethers of polyhydric phenols obtained by reacting a polyhydric phenol with a halogen-containing epoxide of dihalohydrin in the presence of an alkaline medium. Polyhydric phenols that can be used for this purpose include resorcinol, catechol, hydroquinone, methyl resorcinol, or polynuclear phenols, such as 2,2-bis(4-hydroxyphenyl) propane (bisphenol A), 2,2-bis(4-hydroxyphenyl) butane, 4,4'-dihydroxybenzophenone, bis(4-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 2-bromo-1,2-epoxyhexane, 3-chloro-1,2-epoxyoctane, and the like. Such polymeric products may be represented by the general formula:

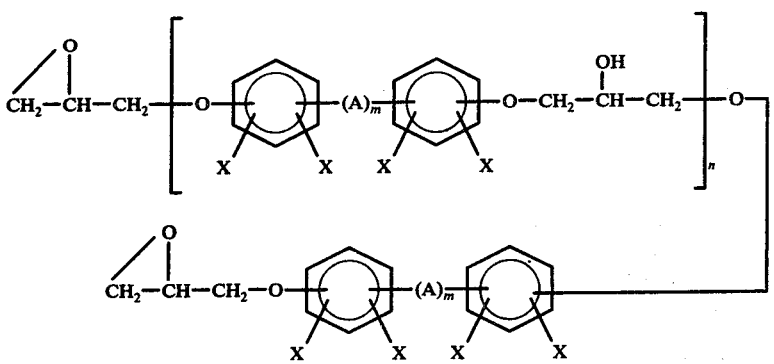

wherein each A is independently a divalent hydrocarbon radical having from 1 to 6 carbon atoms,

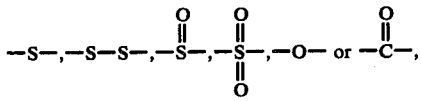

each X is independently hydrogen, an alkyl group of from 1 to 6 carbon atoms, chlorine or bromine, $m$ has a value of zero or 1, and $n$ has an average value from zero to about 20.

The above-described preferred glycidyl polyethers of the dihydric phenols may be prepared by reacting the required proportions of the dihydric phenol and the epichlorohydrin in the presence of a caustic such as sodium hydroxide or potassium hydroxide to neutralize the hydrochloric acid formed during reaction. The reaction is preferably accomplished at temperatures within the range of from about 50° C to 150° C. The heating is continued for several hours to effect the reaction and the product is then washed free of salt and base.

Another group of polyepoxides that may be used comprises the glycidyl ethers of novolak resins, polynuclear polyhydroxy phenols, which are obtained by condensing an aldehyde with a polyhydric phenol in the presence of an acid catalyst. Further preparation of novolak resins is described by T. S. Carswell in Phenoplasts, page 29 et seq. (1947). Typical members of this class are represented by the formula:

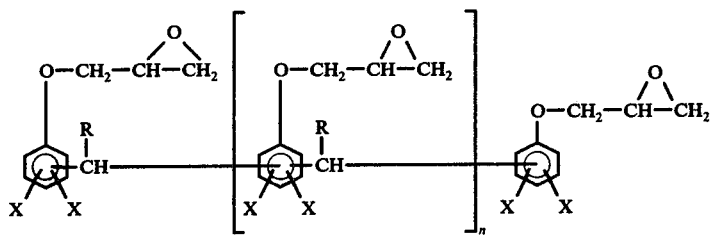

wherein each R is independently hydrogen or an an alkyl group of from 1 to 4 carbon atoms, each X is independently hydrogen, an alkyl group of from 1 to 6 carbon atoms, chlorine, or bromine, and $n$ has an average value of from zero to about 20.

A known organic solvent or combination of organic solvents is employed in which the epoxy resins and curing agent are soluble. Suitable diluents are discussed generally in Chapter 13 of the Lee et al text hereinabove cited. Such a solvent is employed in an amount to produce a solution which is readily pourable at the range of temperature likely to be encountered in the field while preparing the slurry for injection into the well. The solvent should be selected so that it permits the resin to wet the particulate when the resin blend is added to the particulate slurry. The solvent may be, for example, an organic alcohol, ester, ether, ketone, acetate, etc. Specific solvents include, for example, 2-(2-ethoxyethoxy)ethanol, ethyl acetate, amyl acetate, methyl ethyl ketone, methylisobutyl ketone, xylene, ethylene glycol, n-butyl ether, diethylene glycol isobutyl ether, and the like. Specific examples of suitable combinations of solvents include xylene/ethylene glycol ethyl ether e.g. in a 1.5:1 to 0.3:1 weight ratio, and toluene/ethylene glycol ethyl ether. When employed with a resin of the bisphenol-A/epichlorohydrin type, a preferred embodiment is to employ from about 20 to about 75 parts of the aforementioned xylene/ethylene glycol ethyl ether combination of solvents per 100 parts by weight of resin.

The resin is employed in an amount sufficient to coat the particulate material in the slurry. Careful attention must be made to the maximum amount employed since excess resin will affect the permeability of the cured pack; can cause formation damage; and can also make it difficult to remove a portion of the cured pack from the well bore. Also it is to be understood that in most any multi-component system such as the present, the precise limits of operability for one component depend to some extent on other components in the system. For example, somewhat less resin is generally employed where the total surface area of the particulate is relatively small. Generally, however, an effective slurry is obtained by employing from about 2 to 10 percent, and preferably from about 3 to about 9 percent resin, based on the weight of the particulate material employed. More preferably the resin is employed in an amount ranging from about 3.5 to about 5.5 weight percent of the particulate.

B. Curing Agent

The slurry employed herein includes a suitable curing agent. A number of curing agents are known which harden unset epoxy resins. See generally Chapters 5 through 12 of the Lee et al. text. Specific classes of curing agents include, for example, amines, dibasic acids and acid anhydrides. The preferred hardening agents are the amines, especially those having a plurality of amino hydrogen groups. Included are aliphatic, cycloaliphatic, aromatic or heterocyclic polyamines, such as diethylene triamine, ethylene diamine, triethylene tetramine, dimethylamino propylamine, diethylamino propylamine, piperidine, methane diamine, triethyl amine, benzyl dimethylamine, dimethy amino methyl phenol, tri(dimethylaminomethyl) phenol, a-methylbenzyl dimethylamine, meta-xylene diamine, 4,4'-dimethylenedianiline, pyridine, and the like. Mixtures of various amines may be employed. The amines or other curing agent react rather slowly to convert the polyepoxides to an insoluble form. The particular curing agent and concentration thereof can easily be determined by a knowledge of temperature conditions and available working time, i.e. length of time between adding the curing agent and final positioning of the resin-containing mixture downhole.

The curing agent can be employed in an amount ranging from about 40 to more than about 125 percent, preferably about 70-110 percent and more preferably about 85-100 percent, of that stoichiometrically required. The quantity of certain curing agents employed can affect the ultimate compressive strength of certain resin coated particulate materials and, therefore, in any specific formulation these factors can be determined to provide optimum systems.

C. Particulate

The particulate material employed in the slurry can be of any of these commonly employed to form gravel packs. Various sands, gravel, walnut hulls and other nut shells, fruit pits, synthetic resins, gilsonite, coke, glass beads and similar particulate materials can be employed. However, in the practice of this invention, it is preferred to use sand having a diameter ranging from about 0.065 to about 0.01 inch (about 1.68–0.25 mm; 12 to 60 mesh U.S. Sieve Series) and most preferably from about 0.033 to about 0.017 inch (about 0.84–0.42 mm; 20 to 40 mesh U.S. Sieve Series). An effective slurry can generally be prepared using from about 7 to about 20 pounds of particulate per gallon (about 0.84–2.4 kg/liter) of liquid in the slurry, preferably from about 9-17 pounds per gallon (about 1.08–2.04 kg/liter), and more preferably about 14-16 pounds per gallon (about 1.68–1.92 kg/liter). It will be understood that the quantity of particulate which can be employed depends somewhat on the particle size of the particulate and on the viscosity of the liquid portion of the slurry, the latter property depending largely on the extent to which the aqueous carrier is gelled.

D. Aqueous Carrier

The carrier fluid employed in the present invention is an aqueous based liquid. It may be substantially pure water, or a brine, e.g. an aqueous solution of one or more alkali metal halides. Generally, a brine is preferred since it is more likely to be compatible with the formation. The aqueous carrier is preferably substantially free of free polyvalent metal cations, as such cations tend to interfere with development of high strength in the pack when present in a significant concentration, e.g. more than about a few tenths of one percent, depending somewhat upon the particular cations present. Water substantially initially free of metals from which polyvalent metal cations are derived may be employed if available. However, since most water readily available in the field contains appreciable quantities of polyvalent metal cations, the best mode presently contemplated for practicing this invention incorporates the discovery disclosed in application of David R. Carpenter et al. entitled, "Aqueous Based Slurry with Chelating Agent and Method for Forming a Consolidated Gravel Pack," Serial No. 737,455 filed November 1, 1976, namely, the inclusion in the aqueous liquid of at least a sufficient quantity of a chelating agent such as a sodium salt of ethylene diamine tetracetic acid (e.g., $Na_2EDTA$), to chelate substantially all of any polyvalent metal cations present in the water.

To improve the solids carrying capacity of the slurry, the aqueous fluid may contain a viscosity builder, e.g. a gelling agent, if desired. For example, to achieve a slurry with good sand carrying capacity, at about 25° C the aqueous fluid preferably has a viscosity of from about 90 to about 350 centipoise, and most preferably about 125 to about 160 centipoise. An excessively gelled carrier can result in a poorly consolidated pack.

Examples of viscosity builders include various natural gums such as guar gum and other galactomannans, various derivatives and modifications thereof such as hydroxyalkyl guars, various cellulosic derivatives such as cellulose ethers, derivatives of starch, acrylamide polymers, polyvinyl alcohols, and the like. A specific example of a suitable aqueous carrier is one containing about 0.5–0.75 weight percent hydroxyethylcellulose in fresh water or in a brine solution (e.g. 1 to 3 weight percent alkali metal halide). A suitable pH control agent may also be included, if desired, to promote the desired functioning of the gelling agent. Also, the aqueous fluid may optionally contain a breaker for the gelling agent so that initial production of the formation fluids following completion of the well treatment is not hampered. Also, inclusion of a breaker can be effective in minimizing resin loss, especially where the initial viscosity of the gelled aqueous fluid is high. Those skilled in the art will be able to select a suitable viscosity builder and breaker system from those well known in the art. Various gel breakers are also well known, including enzyme breakers or inorganic breakers such as ammonium persulfate and may be included if desired.

E. Coupling Agent

The slurry also includes a coupling agent. Suitable coupling agents are compounds having a group or atom which is capable of reacting with or being strongly held by the particulate material and having a reactive organic group which orients outwardly from the particulate materials and is capable of combining with epoxy resin. Specific coupling agents which can be employed when the particulate material is silicaeous include organosilicon compounds or silanes; those coupling agents taught in U.S. Pat. No. 3,285,339 at col. 3, line 58 throuth col. 8, line 60 and those taught in U.S. Pat. No. 3,625,287, col. 2, lines 3–54 can be employed. The teachings of these patents are specifically incorporated herein by reference. When a siliceous material, e.g. sand or glass beads, is employed as the particulate material and the coupling agent is generally employed in an amount ranging from about 0.05 to about 2 percent based on the weight of said silicaeous particulate material, with a range of from about 0.1 percent to about 1 percent being preferred and about 0.3 to about 0.9 percent being most preferred. Any insufficient amount of coupling agent can result in a pack of decreased strength, whereas too much coupling agent can cause shortened working times.

A catalyst or accelerator can also be employed in the slurry to increase the rate of cure of the epoxy resin. Known accelerators such as salicylic acid, benzoic acid, phenol, etc. in an amount ranging from about 0.2 to about 2.0 percent by weight of the total weight of the resin and curing agent can be employed.

F. Quaternary Ammonium Surfactant

The slurry also contains a surfactant selected from a particular group of quaternary ammonium salts. As used herein, the term "surfactant" when used with a generic description shall be interpreted to include not only the individual species, but also blends of one or more species of the genus. Surfactants suitable for use herein correspond to the formula

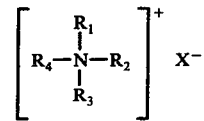

$R_1$ and $R_3$ are each independently a lower alkyl, a hydroxy substituted lower alkyl, or a polyoxyethylene alkyl moiety of the formula — $(CH_2CH_2O)_nH$ were $n$ is 2 or 3. By lower alkyl is meant a straight chain or branched 1-through 4-carbon moiety. Preferably, $R_1$ and $R_3$ each contain at least one hydroxyl substitution. $R_2$ is an 8-through 18-carbon moiety which may be saturated or unsaturated and branched or straight, but not cyclic. $R_4$ is an aliphatic hydrocarbon moiety which may be branched or straight, saturated or unsaturated, or, $R_4$ may be an alkyl aryl moiety. $R_4$ in either case has from 7–18 carbon atoms. Preferably, $R_4$ is an alkyl aryl moiety, most preferably benzyl. $X^-$ represents fluorine, chlorine, bromine, or iodine. A wide variety of the quaternary ammonium chlorides are readily available commercially, and hence are preferred.

The quaternary ammonium compounds suitable for use herein are prepared by methods well known in the art. Preparative methods are found, for example, in Jungermann, Cationic Surfactants, Marcel Dekker, Inc. (1970), pages 28–31 and 43–48; and in Kirk-Othmer *Encyclopedia of Chemical Technology*, 2 ed (1968), Vol. 16, page 863 and Volume 19, pages 558–560 and 562–564.

As laboratory data hereinafter set forth will show, various types of surfactants were evaluated, including other quaternary ammonium salts, but were found to be ineffective in providing an aqueous carried epoxy resin slurry for formimng a consolidated gravel pack of sufficient strength to be of practical utility. Aqueous slurries containing an effective quantity of the particular quaternary ammonium salts hereinabove described, however, were found effective in forming slurries from which consolidated gravel packs of acceptable strengths and porosities could be formed. Although the strengths of packs formed from some embodiments of the aqueous slurry within the broad scope of the present invention are somewhat less than the strengths of packs which can be obtained from oil carried slurries presently in use commercially, such embodiments are not to be disregarded. In many field situations, especially in offshore work and/or in gas wells, a reasonable sacrifice in strength of a proposed pack is very often a very acceptable compromise if certain disadvantages of oil carried slurries, hereinabove discussed, can be avoided which otherwise may have made a decision to attempt emplacement of a consolidated gravel unjustifiable.

A particular sub-genus of the surfactants, hereinabove described, however, namely, alkyl ($C_8$-$C_{18}$) bis (2-hydroxyethyl) benzyl ammonium chlorides and mixtures thereof, has been found particularly effective, resulting in laboratory packs having strength and porosity properties substantially at least as desirable as those obtained with a leading oil-carried system.

To form an effective slurry, from about 0.01 to about 0.23 percent surfactant is generally employed, based on the weight of the particulate. An excess of surfactant can cause shortened working times, whereas too little can result in a pack of poor strength, as well as a high rate of resin loss from the slurry into the formation.

Preferably, the amount of surfactant employed is from about 0.02 to about 0.2 percent of the particulate, and more preferably, from about 0.03 to about 0.1 percent.

G. Preparation and Placement of the Slurry

In preparing the slurry, it is highly preferred that (a) the aqueous carrier, including any thickening, chelating agent, buffer, or breaker employed, the quaternary ammonium surfactant, and the particulate, be separately admixed; (b) the epoxy resin-solvent mixture, curing agent, and coupling agent be separately admixed; and (c) admixtures (a) and (b) be admixed and thoroughly blended with one another to provide a uniform distribution of ingredients. In the preferred order of mixing, admixture (a) may be prepared before, after, or concurrently with admixture (b), so long as each is prepared separately from the other. For some resin systems using species of components embraced within the broad limits of the present invention, it is critical that the preferred order of mixing be followed to obtain a pack of sufficient strength to be of practical utility. With other species of components, an acceptable level of strength may be obtained with other orders of mixing, but the results obtained are definitely inferior to those obtained using the preferred order of mixing.

Contamination of the slurry with fluids such as lease crude, or, where no chelating agent is employed, brines containing polyvalent metal cations, can have a detrimental effect on the strength of the resulting pack. Hence, prior to injection of the slurry, the formation may be treated, if desired, with any slurry-compatible acids, preflushes, pads, or the like. One embodiment of a suitable preflush for example, is a fresh water solution containing about 2 percent by weight KCl and about 10 percent by weight a glycol ether. An example of a suitable pad is a solution of the fluid to be used as the aqueous carrier in the slurry, including any desired thickening agent and the like, plus the quaternary ammonium surfactant. Following the pad, the slurry is injected according to conventional procedures. A screen assembly, such as shown in FIG. 1 of U.S. Pat. No. 3,621,915, is not required although one may be employed if desired. The slurry may be displaced with compatible fluids such as the pad or brine used prior to injection of the slurry. Incompatible displacing fluids may also be used if separated from the slurry by a suitable fluid or mechanical spacer. The well is then shut in to allow the resin to cure. After the resin has cured, the cured portion in the well bore can be drilled out.

IV. Examples and Comparison Runs

The practice of the present invention, its advantages over the prior art, and the significance of the particular surfactant and order of mixing, are further illustrated by the following examples and comparison runs.

Laboratory Screening Test Procedure

Reference will hereinafter be made to a Laboratory Screening Test (LST) Procedure in the context of compressive strength and percent resin loss data. The procedure was found to give a satisfactory level of reproducibility, yet was much quicker to perform than the procedure using a pressure loaded test cell such as that described in U.S. Pat. No. 3,934,455. In carrying out the LST Procedure, 50 cubic centimeters of a slurry were charged to a syringe having a fine screen across the bottom of the chamber to prevent the particulate from entering the exit port of the syringe. The syringe chamber had an internal diameter of substantially 1 inch. The syringe piston was provided with vents to permit escape of air from the syringe chamber. The piston was depressed by the operator by squeezing, resulting in a compaction pressure of about 40-50 pounds per square inch. The piston was depressed at one of two rates: about 5 cc/second in the runs designated "Hard;" and at a rate such that liquid flowed from the syringe at a dropwise rate in the runs designated "Easy." A sample of the liquid squeezed from the slurry was collected for resin loss determination. The syringe and its compressed contents were then placed in a constant temperature bath for curing. The cured plug was removed, cut to a length of about 1¾ inch, and subjected to a compressive strength test. Volatiles were removed from the liquid collected upon compaction of the slurry, and the weight percent solids in the collected liquid calculated. From this figure was subtracted the weight percent dissolved solids originally in the aqueous carrier protion of the slurry (e.g., KCl, gelling agent, and chelating agent or buffer). The difference is reported as percent resin loss.

EXAMPLES 1-7 AND COMPARISON RUNS 1-8

Several laboratory slurries were prepared as follows: Two aqueous carrying fluids were prepared. Each contained, by weight, 3000 parts Tulsa, Oklahoma municipal tap water (containing about 5 mg/l Mg++ and 35 mg/l Ca++), 30 parts potassium chloride, an 19.8 parts hydroxyethyl cellulose. Carrying fluid "N" (no chelating agent) contained in addition, 5 parts sodium bicarbonate. Carrying fluid "C" (with chelating agent) contained in addition, 4.8 parts $Na_2EDTA$.

A standard resin-solvent, hardener, and coupling agent mixture was prepared by admixing for 20 minutes at ambient temperature, by volume, (a) 22 parts of a solution of, by weight, 80 percent D.E.R. 331 brand epoxy resin, which is a liquid epoxy resin of the bisphenol-A/epichlorohydrin type having an average epoxide equivalent weight of about 190, 12 percent xylene, and 8 percent ethylene glycol ethyl ether; (b) 10 parts a 40 weight percent solution of methylenedianiline in ethylene glycol ethyl ether; and (c) 3.4 parts gamma-aminopropyltriethoxysilane.

Slurries were prepared by adding to 164 grams of the respective carrying fluid (N or C) as indicated in Table I, 0.5 percent by volume of the surfactant being evaluated as described below and as indicated in Table I. To this fluid was added 364 grams of 20-40 mesh (U.S. Sieve Series) sand, and finally, 31 milliliters of the resin-solvent/-curing agent/coupling agent blend prepared as described above. Each slurry was admixed for 5 minutes at ambient conditions. Each slurry was charged to a syringe and evaluated according to the LST Procedure hereinabove described. The results are tabulated in Table I. In Table I and others which follow, "Ex." designates an example according to the present invention, and "C.R." designates a comparison run not illustrative of the invention.

The surfactants employed were the following:

C.R.-1: A nonionic blend of a perfluoroalkane-sulfonamido-polymethylenetrimethylammonium iodide (U.S. 2, 759,019), plus an adduct of trimethyl-1-heptanol and seven moles of ethylene oxide, in aqueous isopropanol.

C.R.-2: An anionic surfactant of diethanol fatty amide and glycol fatty ester.

C.R.-3: Wayfos CD brand surfactant, an anionic phosphate ester derived from a linear $C_{10}$-$C_{12}$ ethoxylated alcohol.

drochloride, 30 percent isopropanol, and 43.7 percent inert ingredients. The blend is available commercially under the trademark Adomall.

Table I
RESULTS USING VARIOUS SURFACTANTS

| Run | Surfactant Summary and Remarks | Carrying Fluid | % Resin Loss Hard | % Resin Loss Easy | Comp. Strength (psi)[1] Hard | Comp. Strength (psi)[1] Easy |
|---|---|---|---|---|---|---|
| CR-1 | Nonionic | C | 11.3 | 11.8 | <80 | <80 |
| CR-2 | Nonionic | N | 11.1 | 12.1 | <80 | <80 |
| CR-3 | Anionic | N | 12.3 | 13.6 | <80 | <80 |
| CR-4 | Anionic | N | 11.1 | 10.3 | <80 | <80 |
| CR-5 | Quaternary ammonium chloride, but $R_4$ not met | N | 10.8 | 10.1 | <80 | <80 |
| CR-6 | Quaternary ammonium chloride, but $R_4$ not met | C | 13.6 | 12.3 | <80 | <80 |
| CR-7 | Quaternary ammonium chloride, but $R_4$ not met | N | 12.0 | 11.2 | <80 | <80 |
| CR-8 | Quaternary ammonium chloride, but $R_4$ not met | C | 13.2 | 10.2 | <80 | <80 |
| Ex. 1 | Both conforming and non-conforming quaternary ammonium chlorides present | C | 12.2 | 12.9 | 200 | 160 |
| Ex. 2[2] | $R_1$, $R_3$ both methyl $R_2$, $R_4$ both aliphatic | C | 11.3 | 11.2 | 300 | 420 |
| Ex. 3 | $R_4$ is alkylaryl $R_2$ is aliphatic ($C_{18}$) $R_1$, $R_3$ both methyl | N | 9.7 | 5.3 | 80 | 320 |
| Ex. 4 | Same as Ex. 3 except $R_2$ is $C_{12}$ | N | 8.7 | 5.5 | <80 | 180 |
| Ex. 5 | Same as Ex. 4 except 1.0 rather than 0.5 volume percent of surfactant and its solvent were employed | N | 8.3 | 3.0 | 320 | 370 |
| Ex. 6[3] | $R_1$, $R_3$ both hydroxyalkyl $R_2$ is aliphatic $R_4$ is alkylaryl | C | 4.2 | 1.7 | 2830 | 2890 |
| Ex. 7 | Same as Ex. 6 | N | 4.9 | 1.1 | 3070 | 3430 |

[1] Cores where compressive strength is indicated as <80 did not consolidate at all, or crumbled during handling in preparation for the compressive strength test.
[2] A similarly prepared slurry but containing 1.0 rather than 0.5 percent of the same surfactant blend, based on the volume of the carrying fluid, i.e. about 0.236 weight percent active surfactant based on the weight of sand, failed to develop a pack of adequate strength ($\geq$80 psi).
[3] In a comparable run where D.E.N. 431 brand epoxy novolac resin, a lower-viscosity epoxy novolac resin with an average functionality of 2.2 was substituted for the D.E.R. 331 brand epoxy resin, data for the "Hard" and "Easy" squeeze technique were 5.5% resin loss, 870 psi compressive strength and 1.4% resin loss, 1290 psi compressive strength, respectively, demonstrating the preference for the bisphenol A/epichlorohydrin type epoxies over the novolacs. [End of Table I notes.]

C.R.-4: An anionic surfactant comprising, by volume, 10 parts a saturated hydrocarbon sulfonate, 1 part a 94 percent solution of dodecyl benzene sulfonic acid, and 0.5 part isopropanol.

C.R.-5: A cationic surfactant comprising 55 percent stearyl trimethyl ammonium chloride in aqueous isopropanol.

C.R.-6: 50 Weight percent $C_8$-$C_{18}$ alkyltrimethylammonium chloride in aqueous isopropanol.

C.R.-7 and 8: 50 Weight percent $C_{14}$-$C_{18}$ alkyltrimethyl ammonium chloride in aqueous isopropanol.

Ex.-1: 25 Weight percent $C_8$-$C_{18}$ dialkyldimethyl ammonium chloride and 25 percent $C_{14}$-$C_{18}$ monoalkyltrimethyl ammonium chloride in aqueous isopropanol.

Ex.-2: 4 Parts by volume of Arquad 2C-75, a 75 weight percent semi-liquid of $C_8$-$C_{18}$ dialkyldimethyl ammonium chlorides in aqueous isopropanol; and 1 part by volume an adduct of di-sec-butylphenol and 10 moles ethylene oxide.

Ex.-3: 20 Weight percent stearyldimethylbenzylammonium chloride in isopropanol.

Ex.-4 and Ex.-5: 20 Weight percent lauryldimethylbenzylammonium chloride in isopropanol.

Ex.-6 and 7: By weight, 23.6 percent $C_8$-$C_{18}$ alkylbis(2-hydroxyethyl)benzylammonium chloride, 2.7% N-polyethylenepolyamine (18 mole) N-oleylamine hydrochloride, 30 percent isopropanol, and 43.7 percent inert ingredients. The blend is available commercially under the trademark Adomall.

The data in Table I clearly demonstrates the criticality of using a surfactant selected from a particular group of quaternary ammonium salts, and also demonstrate that the most preferred surfactant of Exs. 6-7 is markedly superior to other embodiements, both in terms of resin loss and compressive strength.

EXAMPLES 8 AND 9

The data reported for Examples 6 and 7, which were obtained at different times using different commercial lots of non-varied components, may appear to suggest the $Na_2EDTA$ was somewhat detrimental. That suggestion would not fairly represent the general trend of observations to date, however. Slurries similar to those employed in Examples 8 and 9 were prepared anew with a common lot of commercial product being used for each of the non-varied components. The only variations from the procedures described for Examples 6 and 7 are the following. Carrying fluid N' was prepared substantially as carrying fluid N described above for Example 7 except carrying fluid N' contained 7.2 parts sodium bicarbonate rather than 5 parts. The resin system for each of Examples 8 and 9 was prepared in the same manner as that for Examples 6 and 7, except that 12 parts, rather than 10 parts, of the curing agent solution was used in the resin blend. The slurries were evaluated using the LST procedure. Results are reported in Table II.

TABLE II
COMPARISON OF EFFECT OF Na₂EDTA AT LOW INITIAL M++ LEVELS

| Run | Carrying Fluid | % Resin Loss Hard | % Resin Loss Easy | Comp. Strength (psi) Hard | Comp. Strength (psi) Easy |
|---|---|---|---|---|---|
| Ex. 8 | C (Na₂EDTA) | 5.0 | 1.6 | 3070 | 3460 |
| Ex. 9 | N' (NaHCO₃) | 5.2 | 1.5 | 2360 | 2800 |

EXAMPLES 10–15 AND COMPARISON RUN 9

A resin system (resin, solvent, curing agent, coupling agent) was prepared in a manner substantially identical to that employed in Examples 8 and 9. Carrying fluids were prepared in admixing in 600 ml of Tulsa, Oklahoma municipal tap water, 6 grams KCl, 0.3 grams NaHCO₃, 3.6 grams hydrooxyethylcellulose, and except in the control run, sufficient salt to provide in the solution, 1000 mg/liter of the respective salt as described in Table III. To 165 ml of the respective carrying fluids was added 0.82 ml (except as noted) of the surfactant blend used in Examples 6-9 and 364 grams of 20-40 mesh (U.S. Sieve Series) sand. To this slurry, was added 30 ml of the resin system. The slurry was admixed for 5 minutes at ambient temperature, then warmed to 115°-120° F, and charged to an 8 inch × 2 inch vertically oriented pressure loaded test cell (PLT cell) such as that described in U.S. Pat. No. 3,934,455, having a piston cap in place on the bottom of the cell. A screen was placed in the cell to prevent particulate migration through the cap. An electric vacuum pump was used to remove excess fluid from the slurry via the bottom cap outlet. A top piston cap was put in place, and 100 psi applied and maintained for 15 minutes using compressed air. The pressure was released, all ports were sealed, and the cell was placed in a 130° F temperature bath for about 20 hours to cure. The cores were then removed from the PLT cell, and compressive strength tests run after the cores had thoroughly cooled to ambient temperature.

TABLE III
EFFECT OF CHELATING AGENT WHERE WATER INITIALLY HIGHER IN M++

| Run | Remarks | Compressive Strength, psi |
|---|---|---|
| Ex. 10 | Control | 3590 |
| Ex. 11 | NaCl added | 2280 |
| Ex. 12 | CaCl₂ added | 1710 |
| C.R. 9 | MgCl₂ added | <80 |
| Ex. 13 | CaCl₂; 2.46 ml surfactant blend | 2950 |
| Ex. 14 | MgCl₂; 3.28 ml surfactant blend | 140 |
| Ex. 15 | MgCl₂; stoichiometric amount Na₂EDTA | 2800 |

Comparison of Example 10 with Example 12 and Comparison Run 9, demonstrates that the presence of free polyvalent metal cations in appreciable amounts is detrimental. Comparison of Example 12 and Comparison Run 9 demonstrates that certain polyvalent metal cations (e.g. Mg) are more detrimental than others (e.g. Ca) at substantially the same weight concentration. Examples 13 and 14 demonstrate that the detrimental effect of polyvalent metal cations can be overcome somewhat by increased surfactant levels. Example 15, when compared with Example 14 and Comparison Run 9, demonstrates the dramatic effect of employing a chelating agent.

EXAMPLES 16–17 AND COMPARISON RUN 10

Substantially the same ingredients were used for the following examples and comparison run, and in substantially the same proportions, as were employed in Example 6. The mixing orders of the components were altered as follows:

Example 16: To the blended carrying fluid was added the quaternary ammonium salt surfactant solution. To this admixture was added the preblended standard resin-solvent, hardener, and coupling agent mixture. Finally, the particulate was added to the fluids.

Example 17: The coupling agent was initially admixed with the carrier, surfactant, and particulate components rather than with the resin system.

Comparison Run 10: All components except the surfactant were admixed initially, and the surfactant was added thereafter.

The slurries were evaluated using the LST procedure, and the results are shown in Table IV.

TABLE IV
EFFECT OF MIXING ORDER

| Run | Summary | % Resin Loss Hard | % Resin Loss Easy | Comp. Strength (psi) Hard | Comp. Strength (psi) Easy |
|---|---|---|---|---|---|
| Ex. 6 | (Carrier + Surfactant + Sand) + (Resin + Coupler) | 4.2 | 1.7 | 2830 | 2890 |
| Ex. 16 | [(Carrier + Surfactant) + (Resin + Coupler)] + Sand | 9.4 | 7.2 | 220 | 340 |
| Ex. 17 | (Carrier + Surfactant + Sand + Coupler) + Resin | 7.3 | 3.8 | 300 | 600 |
| CR-10 | [(Carrier + Sand) + (Resin + Coupler)] + Surfactant | 12.3 | 11.9 | None | Mushy |

The results shown in Table IV demonstrate a definitely preferred order of mixing, but also demonstrate that at least with certain embodiments of ingredients, a pack having utility can be obtained using other than the preferred mixing order. Extended mixing times frequently give somewhat improved results where results are otherwise marginal.

EXAMPLE 18 AND COMPARISON RUNS 11–12

Slurries were prepared and packs formed according to the present invention, designated "Water Carried" in Table V, in the following manner. A resin blend was prepared by admixing for about 15 minutes, 30 grams of D.E.R. 331 brand epoxy resin, 15 grams of 2-ethoxyethanol, 5 grams of xylene and 6.5 grams of methylenedianiline. To this was added 5.6 ml (i.e. about 10 percent, based on the volume of the admixture prepared in the foregoing sentence of gamma-aminopropyltriethoxysilane, and mixing was continued for an additional five minutes. Separately, 0.2 grams of sodium bicarbonate and 2.34 grams of hydroxyethylecellulose were added to 400 ml of Tulsa, Oklahoma tap water containing 0.5 weight percent KCl. The aqueous mixture was admixed for about 15 minutes to permit the hydroxyethylecellulose to hydrate. To the hydrated mixture was added 0.1 gram of ammonium persulfate, and mixing was continued for an additional 10 minutes. To a 150 gram aliquot of the resulting aqueous gel was added 1.5 milliliters of the 23.6 weight percent solution of alkyl bis(2-hydroxyethyl) benzylammonium chloride hereinabove described in the context of Exs. 6-9. After mixing for 3 minutes, 360 grams of sand was added (20-40 mesh, U.S. Sieve Series unless otherwise noted), and mixing was continued for another 3 minutes. Finally, 30 ml of the resin blend was added to the aqueous mixture, and mixing was continued for an additional 5 minutes.

Two oil carried slurries representative of the prior art were prepared. The first, hereinafter designated "CR-11: Oil carried; EGB solvent," was prepared employing the ingredients set forth in U.S. Pat. No. 3,857,444, column 6, lines 10-22, in substantially the same relative proportions. The second, designated "CR-12: Oil carried; AA/EGB solvent," was prepared employing the ingredients set forth in the same patent, Test 2 of Example 3, in substantially the same relative proportions.

Packs were formed from each of the slurries by first placing the slurry in a 150° F bath for 15 minutes to simulate heating of the slurry as it is pumped down a well. The slurry was then charged into a PLT cell and cured as hereinabove described under the caption for Examples 10-15 and Comparison Run 9, except curing was carried out at 150° F. After the cores had cooled, compressive strength and permeability tests were run. Permeability tests were carried out at ambient temperature using diesel oil having a viscosity of 2.5 centipoise, on cores cut to a diameter of 2.62 cm and a length of 2.86 cm. Compressive strength tests were run either at ambient temperature or, where indicated, at 195° F. Cores having a length of 3.27 cm and a diameter of 2.62 cm were used for the ambient temperature compressive strength tests. The cores used in the 195° F compressive strength tests had dimensions substantially the same as those for the cores used in the permeability tests. To prepare a core for compressive strength testing at 195° F, the core was placed in API brine diluted 50 volume percent. A thin layer of mineral oil was floated on the brine to retard evaporation. The core was maintained in the brine at 195° F for 24 hours immediately prior to testing. Results of these tests are summarized in Table V.

greater thermal stability than the tested oil-carried slurry, with a 26 percent strength loss from 2900 psi at ambient temperature to 2220 psi at 195° F, compared to a 30 percent loss sustained by the oil carried slurry (2600 psi to 1860 psi).

Working times for the Ex. 18, CR-11, and CR-12 slurries (20-40 mesh U.S. Sieve Series sand) are set forth in Table VI. In the working time tests, the particular slurry was placed in a mixer maintained at the stated temperature. The mixer was run at about 2000 rpm. Working time reported is the time after which the mixer blade would no longer maintain a speed of about 2000 rpm.

TABLE VI
WORKING TIME OF WATER-CARRIED
SLURRY IN CONTRAST TO OIL CARRIED SLURRIES
(Blanks Indicate Test Not Run)

| Temperature, °F | Working Time, Hours | | |
|---|---|---|---|
| | Ex. 18 | CR-11 | CR-12 |
| 80 | 4.2 | — | — |
| 125 | 1.5 | — | 3 |
| 150 | 1.0 | 2.7 | 1.8 |
| 175 | 0.7 | 1.5 | — |

Although the working times for the tested embodiment of the water carried slurry are somewhat less than those for the oil carried slurries, they are nevertheless more than ample to permit emplacement of batches of the size customarily employed in routine commercial applications.

EXAMPLE 19

An oil well in Orange County, Texas, producing detritus through perforations at a depth of 3299 to 3304 feet, was treated with a slurry of the present invention.

The following fluids were used during the treatment, in addition to the slurry of the present invention:

Cleaning preflush, comprising, by weight, about 1925 parts fresh water, 50 parts KCl, 174 parts ethylene glycol ethyl ether, 3.25 parts Na$_2$EDTA, and 10 parts of the surfactant blend employed in Ex. 6 (hereafter referred to in this example simply as "the surfactant blend");

TABLE V
COMPARISON OF WATER CARRIED SLURRIES AND OIL CARRIED SLURRIES
(Blanks indicate test was not run.)

| Gravel Size | Ex-18: Water Carried | | | CR-11: Oil Carried; EGB Solvent | | | CR-12: Oil Carried; AA/EGB Solvent | | |
|---|---|---|---|---|---|---|---|---|---|
| | Comp. Strength, psi | | Permeability | Comp. Strength | | Permeability | Comp. Strength, psi | | Permeability |
| U.S. Sieve No. | Ambient | 195° F | Darcies | Ambient | 195° F | Darcies | Ambient | 195° F | Darcies |
| 40-60 | 2650 | — | 30 | 1500 | — | 40 | — | — | — |
| 20-40 | 2900 | 2220 | 98 | 2400 | — | 99 | 2600 | 1860 | — |
| 10-20 | 2000 | — | — | 2300 | — | — | — | — | — |
| 8-12 | 1300 | — | — | 1600 | — | — | — | — | — |

From the data in Table V, it is apparent the tested embodiment of the water-carried slurry of the present invention provided packs having compressive strength and permeabilities at least comparable to those obtained with the prior art oil carried slurries, using U.S. Sieve Series 20-40 mesh gravel, the size most commonly employed in routine commercial applications. Compressive strengths on the larger gravel sizes tested were slightly lower with the water carried system, but it should be noted that the resin-curing agent-solvent system was present in an amount of about 1 gallon per 100 lbs of sand (30 ml per 360 grams sand or 40 ml per 480 grams sand) in the oil carried systems, but the same components were present in the water carried system at a concentration of only about 0.9 gallon per 100 lbs of sand (90 volume percent × 30 ml per 360 grams sand). Moreover, the water carried slurry demonstrated Preflush, comprising, by weight, 4200 parts fresh water, 100 parts KCl, 6.5 parts Na$_2$EDTA, and 20.1 parts of the surfactant blend;

Pad, comprising, by weight, about 4200 parts fresh water, 2.5 parts sodium bicarbonate, 42 parts KCl, 6.5 parts Na$_2$EDTA, 27.5 parts hydroxyethyl cellulose, and 20.1 parts of the surfactant blend; and Displacement fluid, comprising, by weight, 4200 parts fresh water, 100 parts KCl, and 615 parts Na$_2$EDTA.

The carrying fluid for the slurry was prepared by admixing 210 barrels fresh water, 1 pound sodium bicarbonate, 17.5 pounds KCl, 2 lbs 10 oz (avdp.) Na₂EDTA, 11 lbs hydroxyethyl cellulose, and 8.05 lbs of the surfactant blend. To this was added 3800 lbs of 20–40 mesh U.S. Sieve Series sand. Separately, a resin-solvent, hardener, and coupling agent mixture was prepared by admixing for 30 minutes at ambient temperature, by volume, (a) 22 parts of a solution of, by weight, 80 percent D.E.R. 331 brand epoxy resin, which is a liquid epoxy resin of the bisphenol-A/epichlorohydrin type having an average epoxide equivalent weight of about 190, 12 percent xylene, and 8 percent ethylene glycol ethyl ether; (b) 10 parts a 40 weight percent solution of methylenedianiline in ethylene glycol ethyl ether; and (c) 3.4 parts gamma-aminopropyltriethoxysilane. The resin mixture was added to the carrier-sand mixture, and blending was continued for 30 minutes to assure uniform distribution of the components, thereby forming a suitable slurry according to the present invention.

The various fluids just described were injected into the well in the following sequence and volumes at an average rate of about 1.5 bbl/min and a pressure of 900–1200 psi, until screenout at 2700 psi:

| Material | Amount (bbls) |
|---|---|
| Cleaning preflush | 6 |
| Preflush | 12 |
| Pad | 6 |
| Slurry | 10 |
| Pad | 4 |
| Displacement fluid | 10-¼ |

The total volume of slurry displaced from the tubing prior to screen-out was estimated to be about 1¼ bbls. After repressuring to 2500 psi the well was shut in for 24 hours. The consolidated gravel pack inside the tubing (total height of about 168 fee) was thereafter drilled out under approximately 10,000 lbs drilling weight at a rate of about 0.6 ft/minute (just over 3 mm/sec). The well was returned to production without swabbing, and produced water, oil, and gas, but no noticeable sand.

What is claimed is:

1. In a slurry suitable for use in emplacing a permeably consolidated particulate mass in communication with a permeable subterranean formation, of the type containing an epoxy resin-solvent mixture, a curing agent for the epoxy resin, a particulate material, and a coupling agent, the improvement which comprises:
   (a) an aqueous based carrying fluid for the slurry, and
   (b) a surfactant in the slurry, selected from the group consisting of quaternary ammonium salts corresponding to the formula

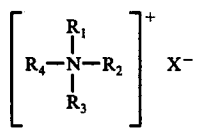

wherein: R₁ and R₃ are each independently lower alkyl, hydroxy substituted lower alkyl, or polyoxyethylene alkyl of the formula —(CH₂CH₂O)ₙH wherein n is 2 or 3; R₂ is an 8- through 18-carbon hydrocarbon chain; R₄ is an aliphatic hydrocarbon chain or an alkyl aryl group, containing 7 to 18 carbon atoms; and X is fluorine, chlorine, bromine, or iodine;
the components of said slurry being provided in amounts and admixed in a sequence such that a pumpable slurry is obtained from which a permeable, consolidated mass can be formed after a suitable curing time.

2. The slurry of claim 1 wherein the surfactant is employed in an amount of from about 0.01 to about 0.23 percent, based on the weight of the particulate.

3. The slurry of claim 1 wherein X represents Cl.

4. The slurry of claim 1 wherein the aqueous carrier is a brine containing at least one alkali metal halide.

5. The slurry of claim 1 wherein the aqueous carrier is substantially free of free polyvalent metal cations.

6. The slurry of claim 5 wherein the aqueous carrier contains from about 1 to about 3 weight percent KCl.

7. The slurry of claim 1 wherein the aqueous carrier contains an effective amount of a gelling agent to enhance the solids carrying capacity of the slurry.

8. The slurry of claim 7 wherein the gelling agent is hydroxyethylcellulose.

9. The slurry of claim 7 wherein the aqueous carrier contains an agent to cause the gel formed by the gelling agent to break to a determinable extent once the slurry has been emplaced.

10. The slurry of claim 1 wherein R₄ is alkylaryl.

11. The slurry of claim 10 wherein X represents Cl.

12. The slurry of claim 10 wherein R₄ is benzyl.

13. The slurry of claim 1 wherein R₁ and R₃ each contain at least one hydroxyl group.

14. The slurry of claim 13 wherein X represents Cl.

15. The slurry claim 14 wherein R₄ is alkylaryl.

16. The slurry of claim 15 wherein R₄ is benzyl.

17. The slurry of claim 16 wherein the surfactant is employed in an amount of from about 0.01 to about 0.23 percent, based on the weight of the particulate.

18. The slurry of claim 16 wherein the surfactant is at least one alkyl (C₈–C₁₈) bis(2-hydroxyethyl)benzylammonium chloride.

19. The slurry of claim 18 wherein the particulate is present in an amount of from about 7 to about 20 pounds per gallon of total liquid in the slurry; wherein the epoxy resin is present in an amount of from about 2 to about 10 percent by weight of the particulate; wherein the curing agent is present in an amount of from about 40 to about 125 percent of that stoichiometrically required to react with the resin; wherein the coupling agent is present in an amount of from about 0.05 to about 2 percent by weight of the particulate; wherein sufficient gelling agent is present so that the aqueous carrier component of the slurry has a viscosity at about 25° C of from about 130 to 350 centipoise; and wherein the surfactant is present in an amount of from about 0.01 to about 0.23 percent based on the weight of the particulate.

20. The slurry of claim 18 wherein the epoxy resin is a glycidyl polyether of a dihydric phenol; and wherein the coupling agent is an organosilane.

21. The slurry of claim 20 wherein the particulate is sand having a diameter ranging from about 0.065 to about 0.01 inch and is present in an amount of from about 14 to about 16 pounds per gallon of total liquid in the slurry; wherein the epoxy resin is of the bisphenol A/epichlorohydrin type and is present in an amount of from about 3.5 to about 5.5 percent, based on the weight of the sand; wherein a blend of xylene and ethylene glycol ethyl ether is present as a solvent for said resin, the weight ratio of xylene and said ether to one another being from about 1.5:1 to about 0.3:1, said blend being present in an amount of from about 20 to about 75 percent based on the weight of the resin; wherein the curing agent is 4,4'-dimethylenedianiline, and wherein said curing agent is present in an amount of from about 85 to about 100 percent of that stoichiometrically required to react with the resin; wherein the coupling agent is gamma-aminopropyltriethoxysilane and said coupling agent is present in an amount of from about 0.3 to about 0.9 percent based on the weight of the sand; wherein the aqueous carrier is a brine substantially free from free polyvalent metal cations, containing, based on the weight of the water, from about 1 to about 3 weight percent KCl and from about 0.5 to about 0.75 weight percent hydroxyethylcellulose; and wherein the surfactant is present in an amount of from about 0.03 to about 0.1 percent, based on the weight of the sand.

22. A method for preparing a slurry comprised of an epoxy resin-solvent mixture, a curing agent for the resin, a coupling agent, an aqueous carrier fluid, a surfactant, and a particulate material, each in effective amounts, said slurry being characterized as suitable for use in forming a permeably consolidated particulate mass, comprising:
 (a) admixing said aqueous carrier fluid, surfactant, and particulate material;
 (b) separately admixing said epoxy resin-solvent mixture, curing agent, and coupling agent; and
 (c) admixing admixture (a) with admixture (b) to form the slurry; said surfactant being selected from the group consisting of quaternary ammonium salts corresponding to the formula

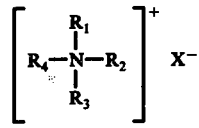

wherein: $R_1$ and $R_3$ are each independently lower alkyl, hydroxy substituted lower alkyl, or polyoxyethylene alkyl of the formula — $(CH_2CH_2O)_nH$ wherein $n$ is 2 or 3; $R_2$ is an 8- through 18-carbon hydrocarbon chain; $R_4$ is an aliphatic hydrocarbon chain or an alkyl aryl group, containing 7 to 18 carbon atoms; and X is fluorine, chlorine, bromine or iodine.

23. The method of claim 22 wherein the surfactant is employed in an amount of from about 0.01 to about 0.23 percent, based on the weight of the particulate.

24. The slurry of claim 22 wherein X represents Cl.

25. The method of claim 22 wherein the aqueous carrier is a brine containing at least one alkali metal halide.

26. The method of claim 22 wherein the aqueous carrier is substantially free of free polyvalent metal cations.

27. The method of claim 22 wherein the aqueous carrier contains from about 1 to about 3 weight percent KCl.

28. The method of claim 22 wherein the aqueous carrier contains an effective amount of a gelling agent to enhance the solids carrying capacity of the slurry.

29. The method of claim 28 wherein the gelling agent is hydroxyethylcellulose.

30. The method of claim 28 wherein the aqueous carrier contains an agent to cause the gel formed by the gelling agent to break to a determinable extent once the slurry has been emplaced.

31. The method of claim 22 wherein $R_4$ is alkylaryl.

32. The method of claim 31 wherein X represents Cl.

33. The method of claim 31 wherein $R_4$ is benzyl.

34. The method of claim 22 wherein $R_1$ and $R_3$ each contain at least one hydroxyl group.

35. The method of claim 34 wherein X represents Cl.

36. The method of claim 35 wherein $R_4$ is alkylaryl.

37. The method of claim 36 wherein $R_4$ is benzyl.

38. The method of claim 37 wherein the surfactant is employed in an amount of from about 0.01 to about 0.23 percent, based on the weight of the particulate.

39. The method of claim 37 wherein the surfactant is at least one alkyl ($C_8$–$C_{18}$) bis(2-hydroxyethyl)benzylammonium chloride.

40. The method of claim 39 wherein the particulate is employed in an amount of from about 7 to about 20 pounds per gallon of total liquid in the slurry; wherein the epoxy resin is employed in an amount of from about 2 to about 10 percent by weight of the particulate; wherein the curing agent is employed in an amount of from about 40 to about 125 percent of that stoichiometrically required to react with the resin; wherein the coupling agent is employed in an amount of from about 0.05 to about 2 percent by weight of the particulate; wherein sufficient gelling agent is employed so that the aqueous carrier component of the slurry has a viscosity at about 25° C of from about 130 to 350 centipoise; and wherein the surfactant is employed in an amount of from about 0.01 to about 0.23 percent based on the weight of the particulate.

41. The method of claim 39 wherein the epoxy resin is a glycidyl polyether of a dihydric phenol; and wherein the coupling agent is an organosilane.

42. The method of claim 41 wherein the particulate is sand having a diameter ranging from about 0.065 to about 0.01 inch and is employed in an amount of from about 14 to about 16 pounds per gallon of total liquid in the slurry; wherein the epoxy resin is of the bisphenol A/epichlorohydrin type and is employed in an amount of from about 3.5 to about 5.5 percent, based on the weight of the sand; wherein a blend of xylene and ethylene glycol ethyl ether is employed as a solvent for said resin, the weight ratio of xylene and said ether to one another being from about 1.5:1 to about 0.3:1, said blend being employed in an amount of from about 20 to about 75 percent based on the weight of the resin; wherein the curing agent is 4,4'-dimethylenedianiline, and wherein said curing agent is employed in an amount of from about 85 to about 100 percent of that stoichiometrically required to react with the resin; wherein the coupling agent is gamma-aminopropyltriethoxysilane and said coupling agent is present in an amount of from about 0.3 to about 0.9 percent based on the weight of the sand; wherein the aqueous carrier is a brine substantially free from free polyvalent metal cations, containing, based on the weight of the water, from about 1 to about 3 weight percent KCl and from about 0.5 to about 0.75 weight percent hydroxyethylcellulose; and wherein the surfactant is employed in an amount of from about 0.03 to about 0.01 percent, based on the weight of the sand.

* * * * *

UNITED STATES PATENT AND TRADEMARK OFFICE
CERTIFICATE OF CORRECTION

PATENT NO. : 4,101,474
DATED : July 18, 1978
INVENTOR(S) : Claude T. Copeland and Vernon G. Constien It is certified that error appears in the above-identified patent and that said Letters Patent are hereby corrected as shown below:

Col. 6, line 13, change "these" to "those".
Col. 7, line 49, change "Any" to "An".
Col. 8, line 37, change "formimng" to "forming".
Col. 12, Table I, Ex. 2$^{(2)}$, Col. 6, change "300" to "330".
Col. 17, line 36, change "fee" to "feet".
Col. 18, Claim 15, before "Claim" insert --of--.

Col. 20, Claim 42, line 62, change "0.01" to "0.1".

Signed and Sealed this

Eighteenth Day of March 1980

[SEAL]

Attest:

SIDNEY A. DIAMOND

Attesting Officer          Commissioner of Patents and Trademarks